Aug. 19, 1952 A. T. FAULKNER 2,607,634
VEHICLE WHEEL
Filed Oct. 11, 1948 2 SHEETS—SHEET 1
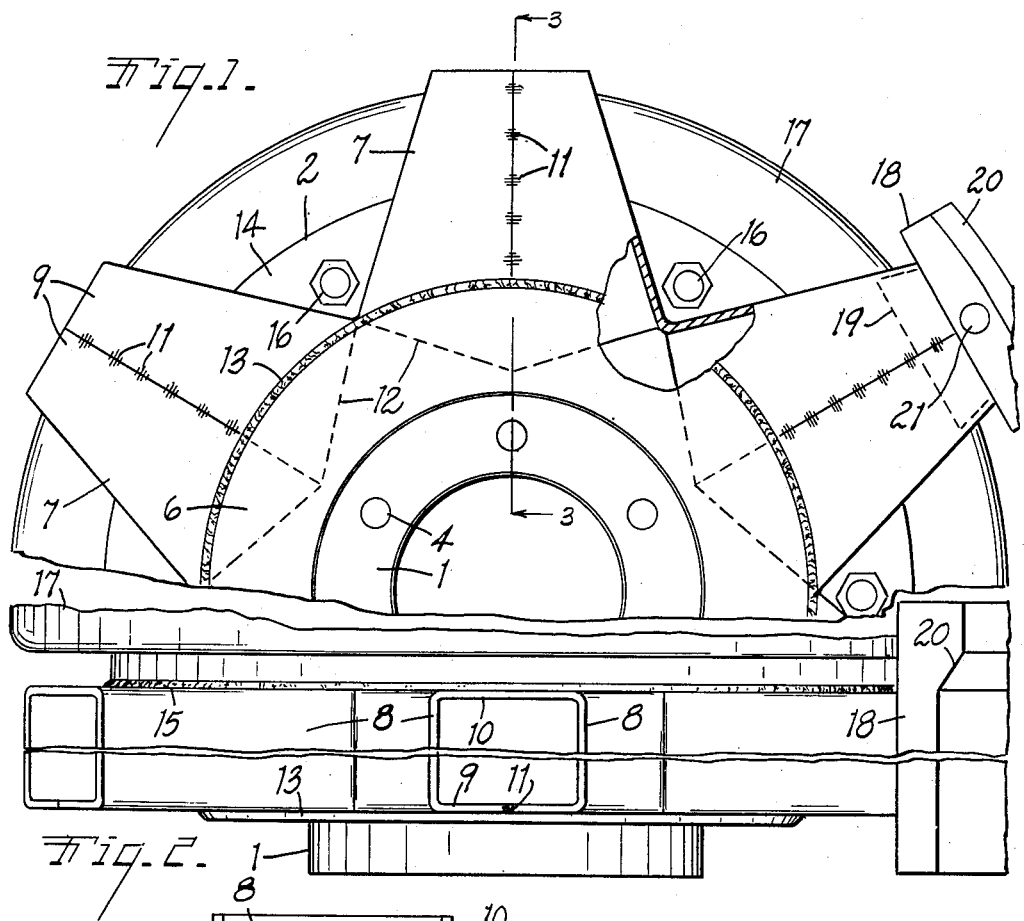
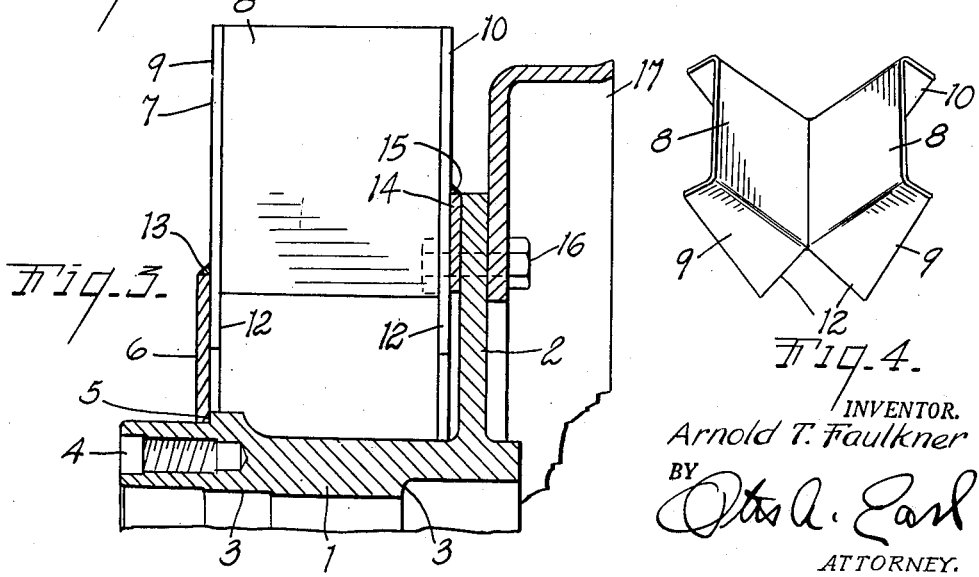
INVENTOR.
Arnold T. Faulkner
BY
Otis A. Earl
ATTORNEY.

Aug. 19, 1952     A. T. FAULKNER     2,607,634
VEHICLE WHEEL

Filed Oct. 11, 1948     2 SHEETS—SHEET 2

INVENTOR.
Arnold T. Faulkner
BY
ATTORNEY.

Patented Aug. 19, 1952

2,607,634

UNITED STATES PATENT OFFICE 2,607,634

VEHICLE WHEEL

Arnold T. Faulkner, Buchanan, Mich.

Application October 11, 1948, Serial No. 53,811

6 Claims. (Cl. 301—66)

This invention relates to improvements in vehicle wheel.

The principal objects of this invention are:

First, to provide a wheel for automotive trucks, farm vehicles and the like which is fabricated at reduced cost from stamped sheet metal parts.

Second, to provide a vehicle wheel which provides adequate strength with a minimum of weight.

Third, to reduce the size and cost of dies required for forming stamped sheet metal vehicle wheels by providing a wheel which can be assembled from a plurality of small similar stampings.

Other objects and advantages relating to details of my wheel will be apparent from a consideration of the following description and the attached drawings. The invention is further pointed out in the claims.

The drawings of which there are two sheets illustrate two forms of my wheel.

Fig. 1 is a fragmentary end elevational view of my wheel partially broken away in vertical cross section.

Fig. 2 is a fragmentary plan view of the edge of the wheel in partially assembled condition.

Fig. 3 is a fragmentary longitudinal cross sectional view through the wheel taken along the plane indicated by line 3—3 in Fig. 1.

Fig. 4 is a perspective view of one of the stampings used to form the spokes of the wheel.

Figure 5:
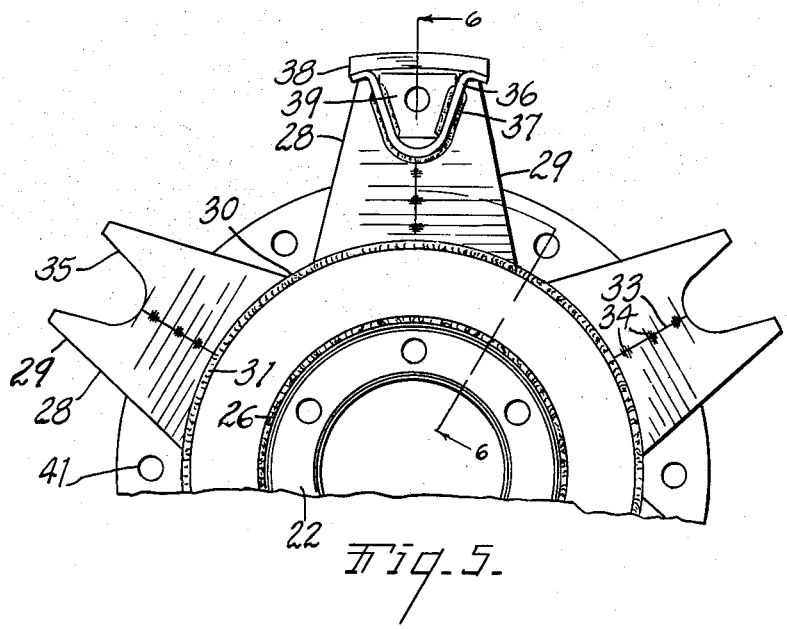
Fig. 5 is a fragmentary end elevational view of a modified form of the wheel.

The first form of my wheel illustrated in Figs. 1 to 4 consists of a hub 1 which may be of cast or forged construction and which is provided with an integral rear hub flange 2 projecting radially outwardly therefrom.

The hub 1 is provided with suitable internal grooves 3 for receiving wheel bearings (not illustrated) and the front face of the hub defines a series of tapped apertures 4 for receiving mounting bolts.

The outer end of the hub 1 defines an external shoulder 5 which forms an abutment for an annular outer hub plate 6 which is preferably of flat sheet metal construction. The outer hub plate 6 is secured to and supports a plurality of spokes generally indicated at 7. The spokes 7 each consist of a pair of sheet metal stampings having a side wall 8 with outer flanges 9 and inner flanges 10 turned transversely therefrom. The opposed edges of the flanges 9 and 10 of each spoke are welded together as at 11 to form a spoke of hollow cross section and open at its inner and outer ends.

As is most clearly illustrated in Fig. 4 each of the stampings which form the spokes 7 includes two side walls 8 which are formed by folding a blank of metal into generally V-shape so that the adjacent side walls diverge radially from each other. The inner and outer flanges are turned transversely from each of the side walls 8.

The radially inner ends of the flanges 9 and 10 extend approximately at right angles from the side walls 8 so that when the two side walls 8—8 of a stamping are bent into diverging relationship the flanges are provided with generally triangular tabs 12 which project radially inwardly from the circumference of the outer flange 6. The outer flanges 9 and their tabs 12 are lapped on the inner side of outer flange 6 so that the periphery of the flange 6 lies adjacent to the fold between the side walls 8. The outer flanges 9 are then welded as at 13 to the outer hub flange.

The inner flanges 10 of the several spokes 7 are further joined together by an annular ring 14 which is welded to the flanges as at 15. The ring 14 extends between the spokes 7 and defines apertures for receiving the mounting bolts 16 which secure the ring 14 and the remainder of the wheel to the inner flange 2 of the hub. The bolts 16 may also secure a brake drum 17 to the wheel.

The shape of the spokes 7 may be of any desired cross section and in the example illustrated, the spokes are of generally rectangular truncated conical cross section tapering toward the outer ends of the spokes. The tapered outer ends of the spokes are adapted to receive cast or forged wheel felly sections 18 having truncated conical bosses 19 on their underside which are telescopically received within the outer ends of the spokes. The felly sections 18 have inner abutment flanges 20 against which a demountable rim may be clamped. Tapped holes 21 are provided in each felly section for receiving lug bolts to clamp the rim to the felly.

Figure 6:
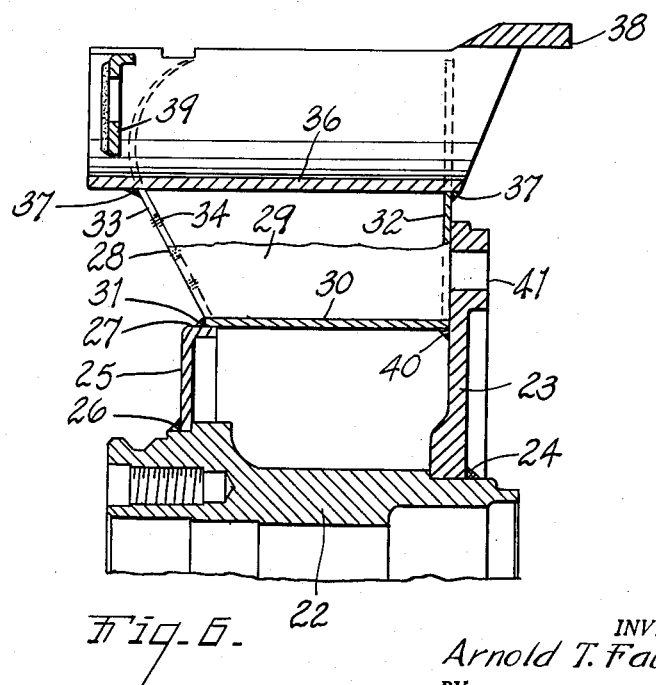
Fig. 6 is a fragmentary longitudinal cross sectional view taken along the planes indicated by the broken line 6—6 in Fig. 5.

The modified form of wheel illustrated in Figs. 5 and 6 consists of a cast or forged hub 22 having a separate inner hub flange 23 welded thereto as at 24. The outer hub flange 25 is of stamped sheet metal construction and is welded to the hub as at 26. The periphery of the flange 25 is provided with an inwardly turned cylindrical rim 27 against which the several spokes 28 are seated.

As in the first form of the wheel each of the spokes 28 is formed from a pair of similar sheet metal stampings and each stamping is formed to provide one-half of each of two adjacent spokes. The side walls 29 of each stamping are bent outwardly from a narrow arcuate center portion 30 which seats against the rim 27 and is secured thereto by welding as at 31. The inner end flanges 32 of each stamping are turned transversely from the side walls 29 so that the inner flanges of adjacent stampings abut to form the inner end walls of a spoke. The outer end flanges 33 of each stamping are similarly turned transversely of the side walls 30 so as to abut and form the outer end wall of the spokes. As in the first form of the wheel the abutting flanges of the stampings are welded together as at 34.

The front flanges and front folds of the spokes in Figs. 5 and 6 are inclined longitudinally and radially outwardly of the wheel to provide a bulging front surface on the spoke and to provide a broader outer end for each spoke. The end walls of the spoke are recessed or notched in generally U-shaped notches 35 and the notches 35 receive the U-shaped inner sides of the stamped or cast felly sections 36. The felly sections 36 are welded to the edges of the notches as at 37 and are provided with inner abutment rims 38. An apertured plate 39 is welded within the U-section at the outer end of each felly section to receive a lug bolt.

In the form of the wheel illustrated in Figs. 5 and 6 the inner ends of the spokes 28 are permanently welded as at 40 to the inner hub flange 23 and the hub flange defines holes 41 between the spokes for receiving bolts to secure a brake drum (not illustrated) to the wheel.

The radially inner ends of the outer end walls of the spokes are cut along segments of a circle equal to the circumference of the rim 27 so that the ends of the spokes rest upon the rim and are secured thereto by continuations of the weld 31.

From the foregoing description it will be apparent that all of the elements of both forms of the wheel are of relatively small and simple size and shape so that they can be rapidly and economically produced. The stampings which form the spokes are identical in any one wheel and can be produced in a simple folding die as there is no necessity for drawing metal in the die or performing a second forming operation to provide a reentrant fold in any portion of the stamping. With suitable jigs, the several elements of the wheel can be quickly and accurately assembled to form a strong relatively light wheel.

Having thus described my invention what I claim as new and desire to secure by Letters Patent is:

1. A vehicle wheel comprising a hub member having inner and outer hub flanges welded thereto, said outer hub flange having an inwardly turned rim of less diameter than the diameter of said inner hub flange, a plurality of spokes having their radial inner ends abutting against and welded to said rim and welded to said inner hub flange, each of said spokes consisting of a pair of sheet metal stampings of generally U-shaped cross section, the flanges of said stampings being abutted and welded to form the inner and outer walls of the spoke, each of said stampings including the side walls of two adjacent spokes joined by a short arcuate portion, the radially outer ends of the inner and outer walls of said spokes defining notches, and a stamped felly section having a generally U-shaped inner end received in and welded to the edges of said notches, said felly sections having a lug bolt receiving plate welded within the U-section thereof.

2. A vehicle wheel comprising a hub member having inner and outer hub flanges welded thereto, said outer hub flange having an inwardly turned rim of less diameter than the diameter of said inner hub flange, a plurality of spokes having their radial inner ends abutting against and welded to said rim, each of said spokes consisting of a pair of sheet metal stampings of generally U-shaped cross section, the flanges of said stampings being abutted and welded to form the inner and outer walls of the spoke, each of said stampings including the side walls of two adjacent spokes, the radially outer ends of the inner and outer walls of said spokes defining notches, and a felly section having a generally U-shaped inner end received in and welded to the edges of said notches, said felly sections having a lug bolt receiving plate within the U-section thereof.

3. A vehicle wheel comprising a hub member having inner and outer hub flanges, said outer hub flange having an inwardly turned rim of less diameter than the diameter of said inner hub flange, a plurality of spokes having their radial inner ends abutting against and welded to said rim, each of said spokes consisting of a pair of sheet metal stampings of generally U-shaped cross section, the flanges of said stampings being abutted and welded to form the inner and outer walls of the spoke, each of said stampings including the side walls of two adjacent spokes, the radially outer ends of the inner and outer walls of said spokes defining notches, and a felly section having a generally U-shaped inner end received in and welded to the edges of said notches.

4. A vehicle wheel comprising a hub member having inner and outer hub flanges, said outer hub flange having an inwardly turned rim of less diameter than the diameter of said inner hub flange, a plurality of spokes having their radial inner ends abutting against and welded to said rim, each of said spokes consisting of a pair of sheet metal stampings of generally U-shaped cross section, the flanges of said stampings being abutted and welded to form the inner and outer walls of the spoke, each of said stampings including the side walls of two adjacent spokes, and a felly section having an inner end received in and welded to the edges of said spoke.

5. A vehicle wheel comprising a hub member having inner and outer hub flanges, said outer hub flange having an inwardly turned rim of less diameter than the diameter of said inner hub flange, and a plurality of spokes having their radial inner ends abutting against and welded to said rim, each of said spokes consisting of a pair of sheet metal stampings of generally U-shaped cross section, the flanges of said stampings being abutted and welded to form the inner and outer walls of a spoke, each of said stampings including the side walls of two adjacent spokes.

6. A sheet metal stamping for forming the spokes of a wheel, said stamping including angularly diverging side wall portions integrally joined together by a relatively narrow center arcuate portion concave toward the center of divergence of said side wall portions, and inner and outer end flanges turned transversely from edges of said side wall portions, the radially inner ends of part of said flanges terminating along an arcuate line coincident with said center portion.

ARNOLD T. FAULKNER.

(References on following page)

REFERENCES CITED

The following references are of record in the file of this patent:

UNITED STATES PATENTS

| Number | Name | Date |
|---|---|---|
| 1,071,684 | Austin | Sept. 2, 1913 |
| 1,220,768 | Murray | Mar. 27, 1917 |
| 1,274,930 | Murray | Aug. 6, 1918 |
| 1,340,961 | Lachman | May 25, 1920 |
| 1,393,795 | Lachman | Oct. 18, 1921 |
| 1,426,881 | Lachman | Aug. 22, 1922 |
| 1,651,541 | Parker | Dec. 6, 1927 |
| 1,863,126 | Reed | June 14, 1932 |
| 2,427,378 | Ash | Sept. 16, 1940 |
| 2,553,161 | Ash | May 5, 1951 |

FOREIGN PATENTS

| Number | Country | Date |
|---|---|---|
| 1,071,684 | Great Britain | Sept. 2, 1913 |